Sept. 29, 1942.  A. E. JOHNSON  2,297,104
PISTON RING
Filed Feb. 21, 1940
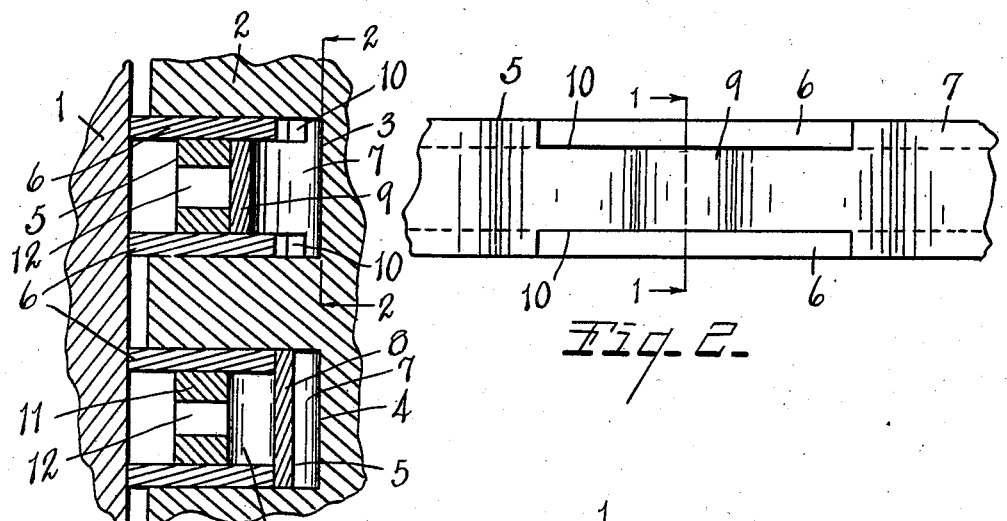
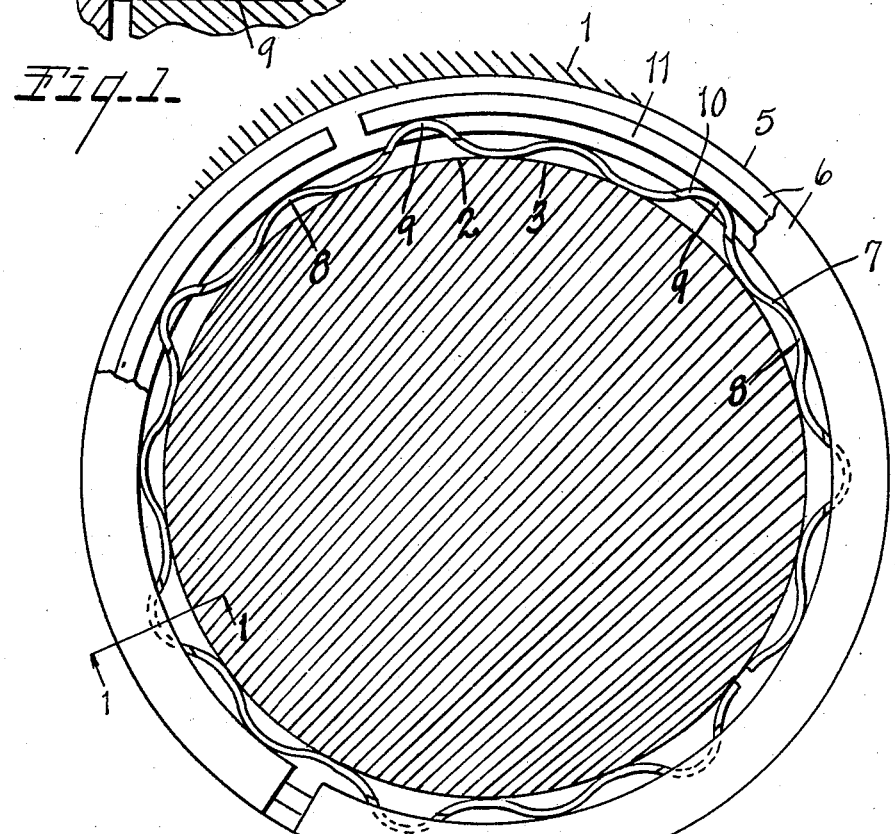
INVENTOR.
ABEN E. JOHNSON
BY Earl D. Chappell
ATTORNEYS Patented Sept. 29, 1942

2,297,104

UNITED STATES PATENT OFFICE 2,297,104

PISTON RING

Aben E. Johnson, Hastings, Mich., assignor to Hastings Manufacturing Company, Hastings, Mich., a corporation of Michigan Application February 21, 1940, Serial No. 320,003

4 Claims. (Cl. 309—45)

This invention relates to improvements in piston rings.

The main objects of this invention are:

First, to provide a novel composite piston ring for internal combustion engines or the like, which is economical of production and exerts a high unit cylinder wall tension.

Second, to provide a composite piston ring assembly including axially spaced cylinder wall engaging elements and novel means for simultaneously spacing the same axially and exerting radial expansive action thereon.

Third, to provide a novel expander for a composite piston ring assembly including a pair of axially spaced cylinder wall engaging elements.

Objects relating to details and economies of the invention will appear from the description to follow. The invention is defined in the claims.

A preferred embodiment of the invention is illustrated in the accompanying drawing, wherein:

Fig. 1 is a fragmentary enlarged view in vertical section illustrating two piston ring installations in accordance with my invention, the uppermost of which is viewed on a line corresponding to line 1—1 of Figs. 2 and 3, the lowermost being viewed at a point spaced angularly from the uppermost section.

Fig. 2 is an enlarged fragmentary view from the inside illustrating the assembly of my invention as viewed from line 2—2 of Fig. 1.

Fig. 3 is a fragmentary side view partially broken away to show the component elements of the assembly of my invention and the operative relation thereof when installed in a piston ring groove.

The present invention relates to improvements in the composite piston ring assemblies such as shown and claimed in patent to Phillips, No. 2,148,997, dated February 28, 1939, wherein a pair of thin steel cylinder wall contacting elements are disposed on edge for engagement with the cylinder wall, being axially spaced by suitable means. My invention relates particularly to the axial spacing means which is embodied in an inner expanding spring which also acts to exert radial outward thrust on the cylinder wall engaging elements. To this extent it is similar in subject matter to an application filed by me concurrently herewith, Serial No. 230,004.

Referring to the drawing, the reference numeral 1 indicates the cylinder of an internal combustion or other engine having a piston 2 reciprocable therein. The latter is provided with axially spaced grooves 3, 4 in each of which is mounted a piston ring assembly in accordance with my invention and generally designated 5.

This assembly consists of a pair of thin split expansible annular cylinder wall engaging elements or segments 6 preferably of ribbon steel or other hard wear-resisting material, which are possessed of considerable inherent radial expansive action. Behind these elements or segments in the groove, I dispose an expanding spring 7 which is of steel or other flexible spring metal. The outline of this spring is clearly shown in Fig. 3.

The expanding spring 7 is provided with a plurality of circumferentially spaced crimps or expander reaches 8 of an axial width approximating the axial dimension between the top and bottom walls of the ring groove but free for radial movement therein, and a plurality of further crimps or spacer reaches 9 alternating with crimps 8, which crimps 9, however, are cut away at the top and bottom edges of the expander spring to an axial width substantially equal to the spacing of segments 6, so as to project between the segments and act as axial spacers therefor. The cutting away of the material at 10 of the crimps 9 is preferably carried out to such a radial extent that the spring does not engage the steel segments 6 at the rear edge thereof, thereby preventing the possibility of wearing into the steel segments.

The above mentioned expander and spacer crimps or reaches are spaced circumferentially from one another by inwardly bowed or concave connection reaches 110 engageable with the bottom of the piston ring groove under radial compression. There is a connecting reach of this type at either side of the expander and spacer reaches or crimps.

In action, the above described crimped expander spring simultaneously exerts supplemental radial thrust on the steel segments at the full width crimps 8 thereof, and spaces said segments properly in the axial direction by means of the reduced projecting portions 10 of crimps 9. The crimps 8 are placed under considerable compression when the assembly is installed in the groove, which causes them to flatten out somewhat, as illustrated in Fig. 3; thereafter they urge the cylinder wall engaging segments 6 outwardly to provide a high unit cylinder wall tension contributed to in part by the thin construction of said segments.

In order to prevent any likelihood of the crimps engaging the cylinder wall so as to cause scoring thereof an annular split guard and spacer member or ring 11 is preferably provided to encircle the crimped inner spring being centered by the projecting narrow crimps 8 thereof. This guard strip should be of a peripherally smooth material which may be relatively soft if desired and is also preferably designed of an axial width equal to the full intended axial spacing of the elements or segments 6 so as to act as a supplemental spacer element for the assembly. However, if desired, the whole axial spacing action may be exerted by the crimps 10, the element 11 serving to prevent engagement of the expander spring with the cylinder wall and floating between segments 6, though preferably centered on projecting crimp portions 9.

For an installation in an oil ring groove, the guard member 11 may be provided with drainage openings 12 or these openings may be omitted if desired, for example, in a compression ring groove installation.

The various elements of the assembly, namely, cylinder segments 6, the inner expanding spring 7, and the member 11, are preferably assembled with the gaps thereof in angularly spaced relation to one another.

I have illustrated and described my improvements in an embodiment which is very practical. I have not attempted to illustrate or described other embodiments or adaptations as it is believed this disclosure will enable those skilled in the art to embody or adapt my improvements as may be desired.

Having thus described my invention, what I claim as new and desire to secure by Letters Patent, is:

1. A composite piston ring assembly comprising a pair of thin split expansible cylinder wall engaging elements of wear resisting material, a combined expander and spacer element formed of ribbon steel and having a plurality of spaced outwardly bowed expander reaches engageable with the inner edges of said cylinder wall engaging elements and having a plurality of outwardly bowed spacer reaches alternating with said first named reaches and of substantially greater radial height, said spacer reaches being of axial width equal to the spacing of said cylinder wall engaging elements to engage between said cylinder wall engaging elements and constitute spacers therefor, said spacer reaches being joined at each side thereof to said expander reaches by inwardly bowed reaches constituting thrust reaches for engagement with the bottom of a piston ring groove in which the assembly is installed.

2. A composite piston ring assembly comprising a pair of axially spaced cylinder wall engaging elements, a combined spacer and expander spring member comprising a plurality of spaced outwardly bowed expander reaches engageable with the inner edges of said cylinder wall engaging elements, and a plurality of outwardly bowed spacer reaches alternating with said expander reaches and joined thereto at each side by inwardly bowed connecting reaches of substantial length engageable with the bottom of a piston groove in which the assembly is installed, said spacer reaches extending outwardly between said cylinder wall engaging elements and being of axial width equal to the axial spacing of the cylinder wall engaging elements, so as to engage and constitute spacer elements for said cylinder wall engaging elements, and a split annular combined guard and spacer members disposed between said cylinder wall engaging elements and in supported relation to and centered by said spacer elements.

3. A composite piston ring assembly comprising a pair of axially spaced cylinder wall engaging elements, and a combined spacer and expander spring member comprising a plurality of spaced outwardly bowed expander reaches engageable with the inner edges of said cylinder wall engaging elements, and a plurality of outwardly bowed spacer reaches alternating with said expander reaches and joined thereto at each side by inwardly bowed connecting reaches engageable with the bottom of a piston ring groove in which the assembly is installed, said spacer reaches extending outwardly between said cylinder wall engaging elements and being of axial width equal to the axial spacing of the cylinder wall engaging elements, so as to engage and constitute spacer elements for said cylinder wall engaging elements.

4. A combined spacer and expander spring element for a piston ring assembly, comprising a split spring member having a plurality of spaced outwardly bowed expander reaches, a plurality of spacer reaches outwardly bowed to a greater radial extent and being of lesser axial dimension than said expander reaches, said spacer reaches alternating with said expander reaches being joined thereto at each side by inwardly bowed connecting reaches of substantial length engageable with the bottom of a piston groove in which the assembly is installed.

ABEN E. JOHNSON.